United States Patent
Krisman et al.

(10) Patent No.: US 11,842,392 B2
(45) Date of Patent: Dec. 12, 2023

(54) SYSTEM, METHOD AND APPARATUS FOR PROVIDING ADAPTIVE CONSUMER CHECKOUT OPTIONS

(71) Applicant: Affirm, Inc., San Francisco, CA (US)

(72) Inventors: Shawn Krisman, San Francisco, CA (US); Jaya Pareek, San Francisco, CA (US); Jeremy Mittleman, San Francisco, CA (US); Kenny Eimer, San Francisco, CA (US); Michael Boardman, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 0 days.

(21) Appl. No.: 17/478,074

(22) Filed: Sep. 17, 2021

(65) Prior Publication Data

US 2023/0091717 A1    Mar. 23, 2023

(51) Int. Cl.
  *G06Q 40/03* (2023.01)
  *G06Q 20/10* (2012.01)
  *G06Q 20/22* (2012.01)

(52) U.S. Cl.
  CPC ........... *G06Q 40/03* (2023.01); *G06Q 20/102* (2013.01); *G06Q 20/22* (2013.01)

(58) Field of Classification Search
  CPC .................................................. G06Q 20/102
  USPC ........................................................ 705/38
  See application file for complete search history.

(56) References Cited

U.S. PATENT DOCUMENTS

| | | | | |
|---|---|---|---|---|
| 8,909,551 | B2 * | 12/2014 | Pawlusiak | G06Q 40/02 705/38 |
| 2002/0040339 | A1 * | 4/2002 | Dhar | G06Q 10/10 705/38 |
| 2012/0036042 | A1 | 2/2012 | Graylin et al. | |

(Continued)

FOREIGN PATENT DOCUMENTS

| | | |
|---|---|---|
| EP | 3249622 A1 | 11/2017 |
| WO | WO-2007025245 A2 * | 3/2007 ............ G06Q 30/02 |

OTHER PUBLICATIONS

1. Authors: Zing Zhong et al; Title: A dynamic self-adoptive genetic algorithm for personal credit risk assessment; IEEE Xplore; Date of Conference: Jun. 23-25, 2010; Date Added to IEEE Xplore: Aug. 3, 2010 (Year: 2010).*

(Continued)

*Primary Examiner* — Bruce I Ebersman
*Assistant Examiner* — Hatem M Ali
(74) *Attorney, Agent, or Firm* — Burr & Forman LLP (57) ABSTRACT

A method for employing adaptive credit decisions in relation to extension of a loan to a user may include receiving user information associated with the user and transaction information associated with a transaction of the user with respect to a product or service offered by a vendor, employing a first credit decision model to execute a first credit extension decision with respect to a first type of financing option based on the user information and the transaction information, employing a second credit decision model to execute a second credit extension decision with respect to a second type of financing option based on the user information and the transaction information, and determining, based on the first and second credit extension decisions, whether to extend a credit offer to the user when the user proceeds to checkout for the transaction.

14 Claims, 5 Drawing Sheets

(56) References Cited

U.S. PATENT DOCUMENTS

| | | | |
|---|---|---|---|
| 2015/0058143 A1* | 2/2015 | Zeinfeld | G06Q 40/025 705/16 |
| 2015/0142713 A1* | 5/2015 | Gopinathan | G06Q 40/00 706/14 |
| 2018/0240126 A1 | 8/2018 | Miyagi | |
| 2022/0051316 A1* | 2/2022 | Bouchard | G06Q 40/03 |

OTHER PUBLICATIONS

2. Authors: Dawei Cheng et al; Title: Prediction Defaults for Networked-guarantee Loans; IEEE Xplore; Date of Conference: Aug. 20-24, 2018; Date Added to IEEE Xplore: Nov. 29, 2018 (Year: 2018).*

Extended European Search Report for corresponding European Application No. 22190867.6 dated Feb. 8, 2023, all pages cited in its entirety.

* cited by examiner

SYSTEM, METHOD AND APPARATUS FOR PROVIDING ADAPTIVE CONSUMER CHECKOUT OPTIONS

TECHNICAL FIELD

Example embodiments generally relate to financial industry technologies and, in particular, relate to apparatuses, systems, and methods for enabling an adaptive workflow around the process of checking a consumer out in relation to purchasing goods or services.

BACKGROUND

The financial industry is comprised of many thousands of customers, vendors, lenders, borrowers, and other bit players that all interact in various ways to enable customers to ultimately have access to goods and services provided by the vendors. Credit and debit transactions have long been a way that individuals have managed point of sale transactions to ensure relatively seamless transfer of funds from customers, or on their behalf, to vendors for relatively routine or small transactions. Meanwhile, obtaining a loan from a bank has long been the most common way of obtaining financing for non-routine or larger transactions. More recently, buy now, pay later financing has become a popular option.

In many of cases, a customer may interact with a vendor or lender to work through a transaction that ultimately provides the vendor with the necessary funds to complete the transaction. The workflow that is used to complete the transaction is almost always dictated precisely according to the payment method that will be employed. If some form of financing is to be employed, a single workflow that is dictated by the selection of the type of financing is similarly selected at the start of the transaction.

In some cases, the selection of the type of financing that will be used is strictly dictated by the type of goods, the amount of the transaction, or other factors. In each case, the type of financing would be selected first, and then the consumer would be guided through the appropriate workflow that corresponds to the type of financing selected and proceed to the checkout in the selected workflow. Thus, there is no flexibility provided at checkout, which is where the consumer may finally have the fullest picture of the costs, and may otherwise better appreciate having an ability to make an informed decision as to precisely how to finance the transaction. Thus, a more adaptive system for selection of financing options, at checkout, may be desired.

BRIEF SUMMARY OF SOME EXAMPLES

Accordingly, some example embodiments may enable the provision of technical means by which to provide a foundation for enabling adaptive checkout.

In an example embodiment, a method for employing adaptive credit decisions in relation to extension of a loan to a user may be provided. The method may include receiving user information associated with a user and transaction information associated with a transaction of the user with respect to a product or service offered by a vendor, employing a first credit decision model to execute a first credit extension decision with respect to a first type of financing option based on the user information and the transaction information, employing a second credit decision model to execute a second credit extension decision with respect to a second type of financing option based on the user information and the transaction information, and determining, based on the first and second credit extension decisions, whether to extend a credit offer to the user when the user proceeds to checkout for the transaction.

In another example embodiment, an apparatus for employing adaptive credit decisions in relation to extension of a loan to a user may be provided. The apparatus may include processing circuitry configured for receiving user information associated with a user and transaction information associated with a transaction of the user with respect to a product or service offered by a vendor, employing a first credit decision model to execute a first credit extension decision with respect to a first type of financing option based on the user information and the transaction information, employing a second credit decision model to execute a second credit extension decision with respect to a second type of financing option based on the user information and the transaction information, and determining, based on the first and second credit extension decisions, whether to extend a credit offer to the user when the user proceeds to checkout for the transaction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As noted above, the typical workflow for customer checkout, particularly when a financing option is employed, is predetermined early in the transaction. In this regard, for example, a user may be offered or select a first type of financing option (e.g., a split pay option where, for example, the user pays in 3 or 4 interest-free payments for their purchases) or a second type of financing option (e.g., an installment loan) early in the processing of a transaction. An attempt at defining some form of "hybrid" system may include the definition of specific average order values (AOVs) values that predetermine which of the first or second type of financing option will be offered to the customer. In such an example, if the AOV is less than $300, the customer may be offered the split pay option, and if the AOV is above $300, the customer may be offered the installment loan option. Even in this hybrid example, the workflow for the rest of the transaction will then be fixed until final checkout.

In the context described above, the split pay option may be associated with a relatively short series of payments that are made to divide up the cost of the transaction (with or without interest or a service fee added). Split pay options may be generally made available for relatively small AOVs such as, for example, less than $300. Given that the split pay option is of relatively short duration (e.g., six biweekly payments), the loan advanced to the customer may be self-originated (i.e., originated by the financial services company offering the split pay option, without assistance from an external bank). Low or even zero percent interest charges may accompany the split pay option given its short duration.

Meanwhile, the installment loan option described above may involve larger AOVs and longer duration. For example, the AOV threshold may be anything larger than $300, and terms may include 3, 6, 12, 18 or 24 month terms. Installment loans may, in some cases, involve the participation of external bank partners, and typically include interest or other financing charges that are larger than those associated with the split pay option.

Whichever type of financing option is selected will then define the workflow for the rest of the transaction all the way to checkout. The workflow will typically include some form of information gathering and approval process, which may include a credit check, identity confirmation, fraud check, etc., and will result in either a decision to extend the credit to the customer or a decision to deny credit extension. The level of information gathered, and the use of such information in making a decision can vary for each of the different types of financing options. If the decision to extend credit is made, the customer proceeds to checkout by finalizing the terms of the corresponding type of financing option. If the decision is instead made to deny credit extension, there is typically no option to proceed (or attempt to proceed) by a different workflow for possible qualification for a different type of financing option.

Using the system described above, there are a number of situations where credit extension may be denied, or customers may not be pleased with the rigid financing terms provided to them. In each of these situations, the end result may be that a sale never happens, or that financing for the sale is achieved in a different way. To the extent a financial services company wishes to incentivize merchants and customers to avail themselves of the financial services provided by the company, a more adaptive approach may be beneficial. In this regard, it seems that there is an appetite among customers for zero interest options that are not strictly limited to low AOVs. Similarly, even though shorter term zero interest options may be available, some customers will nevertheless prefer an interest bearing financing option if it enables them the opportunity to pay the loan back over a longer term.

Some example embodiments described herein provide for an adaptive credit extension platform that can be instantiated at an apparatus comprising configurable processing circuitry. The processing circuitry may be configured to execute various processing functions on financial data using the techniques described herein. The adaptive credit extension platform may, for example, be configured to provide a way to proceed to checkout in more flexible (or adaptive) way that gives customers greater flexibility to choose between different types of financing options. The increased flexibility provided to customers may translate into more access to credit, more active customers, and better conversion rates for vendors. However, the increased flexibility also necessarily drastically alters the workflow processes since decisions and determinations that are normally handled early on in the process must be deferred to later in the process, which can have significant changes to the interface with the customer, and to the system that presents the interface.

Example embodiments may be employed in underwriting decisions made at checkout or time of purchase though at least some of the decision making may be made during the process leading up to checkout. In relation to underwriting decisions, macroeconomic conditions and seasonality may have an impact on the business of a financial institution or organization. In response to these factors, and various tuning efforts that may normally be employed, an adaptive transactional credit model may utilize all inputs and factors to make a credit extension decision (i.e., whether to extend credit to the user to pay for a transaction) for a customer for each of at least two independent credit determinations for respective different types of financing options. In this regard, the adaptive transactional credit model may consider the amount of credit requested, the credit score of the user, and numerous other conventional factors that may or may not include specific records of past and recent transactions with a particular company in order to make the credit extension decision.

Figure 1:
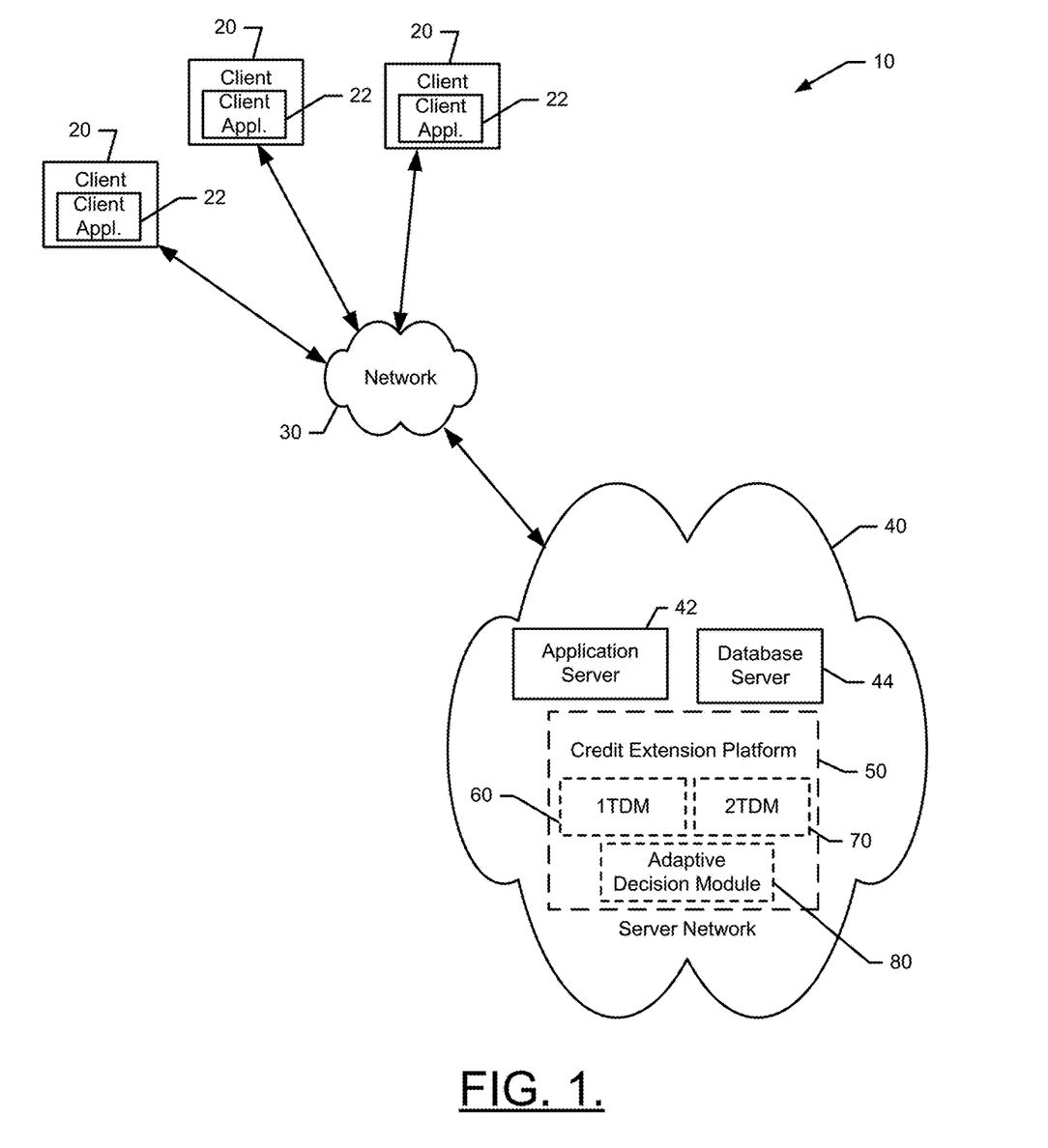
FIG. 1 illustrates a functional block diagram of a system for extending adaptive credit for financial transactions at checkout according to an example embodiment.

An example embodiment of the invention will now be described in reference to FIG. 1, which illustrates an example system in which an embodiment of the present invention may be employed. As shown in FIG. 1, a credit management system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The clients 20 may, in some cases, each be associated with a single computer or computing device that is capable of executing software programmed to implement example embodiments. Thus, in some embodiments, one or more of the clients 20 may be associated with an organization (e.g., a vendor company) and may be located in different business units, branch offices, or other locations. In other cases, the clients 20 may be associated with individual users (i.e., customers) that may wish to interact with other clients 20 and/or a financial institution or entity. In general, the clients 20 may be terminals or platform entities that are capable of executing example embodiments, and there could be as few as one, or a host of such terminals or entities.

Each one of the clients 20 may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include or be capable of executing a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing financial data as described in greater detail below.

The network 30 may be a data network, such as one or more instances of a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 42), and/or a database server 44, which together may form respective elements of a server network 40. Although the application server 42 and the database server 44 are each referred to as "servers," this does not necessarily imply that they are embodied on separate servers or devices. As such, for example, a single server or device may include both entities and the database server 44 could merely be represented by a database or group of databases physically located on the same server or device as the application server 42. The application server 42 and the database server 44 may include hardware and/or software for configuring the application server 42 and the database server 44, respectively, to perform various functions. As such, for example, the application server 42 may include processing logic and memory enabling the application server 42 to access and/or execute stored computer readable instructions for performing various functions. In an example embodiment, one function that may be provided by the application server 42 may be the provision of access to information and/or services related to credit extension platform 50, and more particularly relating to facilitating financial computations and calculations related to decisions associated with extensions of credit (e.g., loans where, for example, the loans may include a buy now, pay later loan, or other products associated with credit or lending transactions). For example, the application server 42 may be configured to provide (via the credit extension platform 50) execution of instructions, and storage of information descriptive of events or activities, associated with the credit extension platform 50 and the execution of a financial computations, calculations and modeling on behalf of a user of the system 10 located at one of the clients 20, or interacting with a user located at one of the clients 20, in real time. In some cases, the financial transaction may include obtaining buy now, pay later financing, and the activities associated therewith may include the provision of a loan/product application detailing information required by the lender (and operator of the credit extension platform 50) to determine whether credit, funds, or other products can be provided to the customer based on information provided in the loan/product application. However, example embodiments may also apply to other types of loans.

In some embodiments, the credit extension platform 50 may be a technical device, component or module affiliated with the lender or an agent of the lender. Thus, the credit extension platform 50 may operate under control of the lender or agent of the lender to be a technical means by which to carry out activities under direction of the lender/agent or employees thereof. As such, in some embodiments, the clients 20 may access the credit extension platform 50 services, and more particularly contact the credit extension platform 50 online and utilize the services provided thereby. However, it should be appreciated that in other embodiments, an application (e.g., the client application 22) enabling the clients 20 to interact with the credit extension platform 50 (or components thereof) may be provided from the application server 42 (e.g., via download over the network 30) to one or more of the clients 20 to enable recipient clients 20 to instantiate an instance of the client application 22 for local operation such that the credit extension platform 50 may be a distributor of software enabling individual users to utilize the credit extension platform 50. Alternatively, another distributor of the software may provide the client 20 with the client application 22, and the credit extension platform 50 may communicate with the client 20 (via the client application 22) after such download.

In an example embodiment, the client application 22 may therefore include application programming interfaces (APIs) and other web interfaces to enable the client 20 to conduct operations as described herein via the credit extension platform 50. The client application 22 may include a series of control consoles or web pages including a landing page, onboarding services, activity feed, account settings (e.g., user profile information), transaction management services, payment management services and the like in cooperation with a service application that may be executed at the credit extension platform 50. Thus, for example, the client application 22 may enable the user or operator to articulate and submit queries, make credit extension requests, initiate and pay for transactions using funds associated with a credit extension request, and/or the like using the credit extension platform 50.

In an example embodiment, the application server 42 may include or have access to memory (e.g., internal memory or the database server 44) for storing instructions or applications for the performance of various functions and a corresponding processor for executing stored instructions or applications. For example, the memory may store an instance of the credit extension platform 50 configured to operate in accordance with an example embodiment of the present invention. In this regard, for example, the credit extension platform 50 may include software for enabling the application server 42 to communicate with the network 30 and/or the clients 20 for the provision and/or receipt of information associated with performing activities as described herein. Moreover, in some embodiments, the application server 42 may include or otherwise be in communication with an access terminal such as any one of the clients 20 (e.g., a computer including a user interface) via which individual operators or managers of the entity associated with the facilitation agent may interact with, configure or otherwise maintain the credit extension platform 50. Thus, it should be appreciated that the functions of the credit extension platform 50 can be conducted via client-server based interactions involving communications between clients 20 and the server network 40, or may be conducted locally at one of the clients 20 after an instance of the credit extension platform 50 is downloaded (e.g., via or as the client application 22) locally at the corresponding one of the clients 20.

As such, the environment of FIG. 1 illustrates an example in which provision of content and information associated with the financial industry may be accomplished by a particular entity (namely the credit extension platform 50 residing at the application server 42 or at one of the clients 20). Thus, the credit extension platform 50 may be configured to handle provision of content and information that are secured as appropriate for the individuals or organizations involved and credentials of individuals or organizations attempting to utilize the tools provided herein may be managed by digital rights management services or other authentication and security services or protocols that are outside the scope of this disclosure.

As noted above, the credit extension platform 50 may operate to enable the user associated with a given one of the clients 20 to setup an account (i.e., a user account) with an entity that operates the credit extension platform 50. After account setup, the user may initiate transactions with various vendors and fund the transactions via credit extended by the entity. Notably, account setup may occur prior to the user attempting to initiate any particular transaction, or may occur while the user is in the process of conducting a particular transaction. Thus, for example, the user may already have the user account prior to conducting transactions, or the user may setup the user account while conducting a transaction.

In an example embodiment, the credit extension platform 50 may enable the user to request an extension of credit in connection with a transaction where the type of financing option for which the extension of credit is to be requested is not specifically identified until the user has proceeded to checkout (either at a physical checkout counter in a brick and mortar store, or at a virtual checkout in an online application). To accomplish this, the credit extension platform 50 of some example embodiments may conduct at least two different and separate determinations regarding credit extension for at least two corresponding different types of financing options so that, for example, one or more offers of credit (each potentially having different terms) may be provided to the user at checkout for each of the at least two corresponding different types of financing options. As an example, prior to checkout, the credit extension platform 50 may make a determination as to the creditworthiness of the user via two separate determinations where one such determination is for a first type of financing option (e.g., a split pay option), and the other such determination is for a second type of financing option (e.g., an installment loan option). One or more split pay option credit offers for which the user is qualified may then be provided alongside one or more installment loan option credit offers for which the user is qualified at checkout. In some situations where the user does not qualify for credit extension under one or both of the types of financing options, only credit offers for the type of financing option for which the user qualifies (e.g., if the user qualifies for just one type) or no credit offers may be presented (e.g., if the user does not qualify for either type).

In some example embodiments, a decision model may be provided to guide the ability of the credit extension platform 50 to make a credit extension decision regarding each of the different types of financing options. Thus, for example, a split pay decision model and an installment loan decision model may be provided for this purpose. However, an additional model (e.g., an adaptive decision model) may also be provided that can determine which credit offers are to be provided to the user based on the two decisions made with respect to each individual one of the two different types of financing options. The credit offers may include combinations of, or selected ones of individual options associated with each of the two different types of financing options for which the user has been qualified, or for which credit extension is approved.

Example embodiments may also employ machine learning with respect to many different data points associated with the user, the vendor, the type of transaction, or many other pieces of relevant information. The use of machine learning may be tailored to providing the user with credit offers that include payment options that are most likely to be useful to the user.

In some cases, for example, the client application 22 may be used to engage (e.g., via a website and corresponding APIs) with the credit extension platform 50 to select individual products, services, or the like that the user has an interest in purchasing in connection with an online transaction. The credit extension platform 50 may then be leveraged to perform the analysis described above to determine which credit offers to present to the user at checkout. At final checkout, the user may then be enabled to finalize the transaction. The credit extension platform 50 may prompt the client 20 to provide product details, information identifying the user (or a user account associated with the user) and/or other information associated with the financial transaction that is being evaluated. In other words, the client 20 may provide a user interface function for interacting with the credit extension platform 50 to identify the information that will be evaluated using the credit extension platform 50.

Regardless of how the queries, calculations or modeling activities are initiated, the credit extension platform 50 of FIG. 1 may be used to manage execution of such activities. Each of these activities may have its own respective timing and calculations and communications that are facilitated by the credit extension platform 50 and various components of the credit extension platform 50 may be conducted in parallel. The components, which may be functional modules that operate via API or function calls to respective segmented platforms or a monolith or other collection of rules, policies, instructions, or the like.

Figure 2:
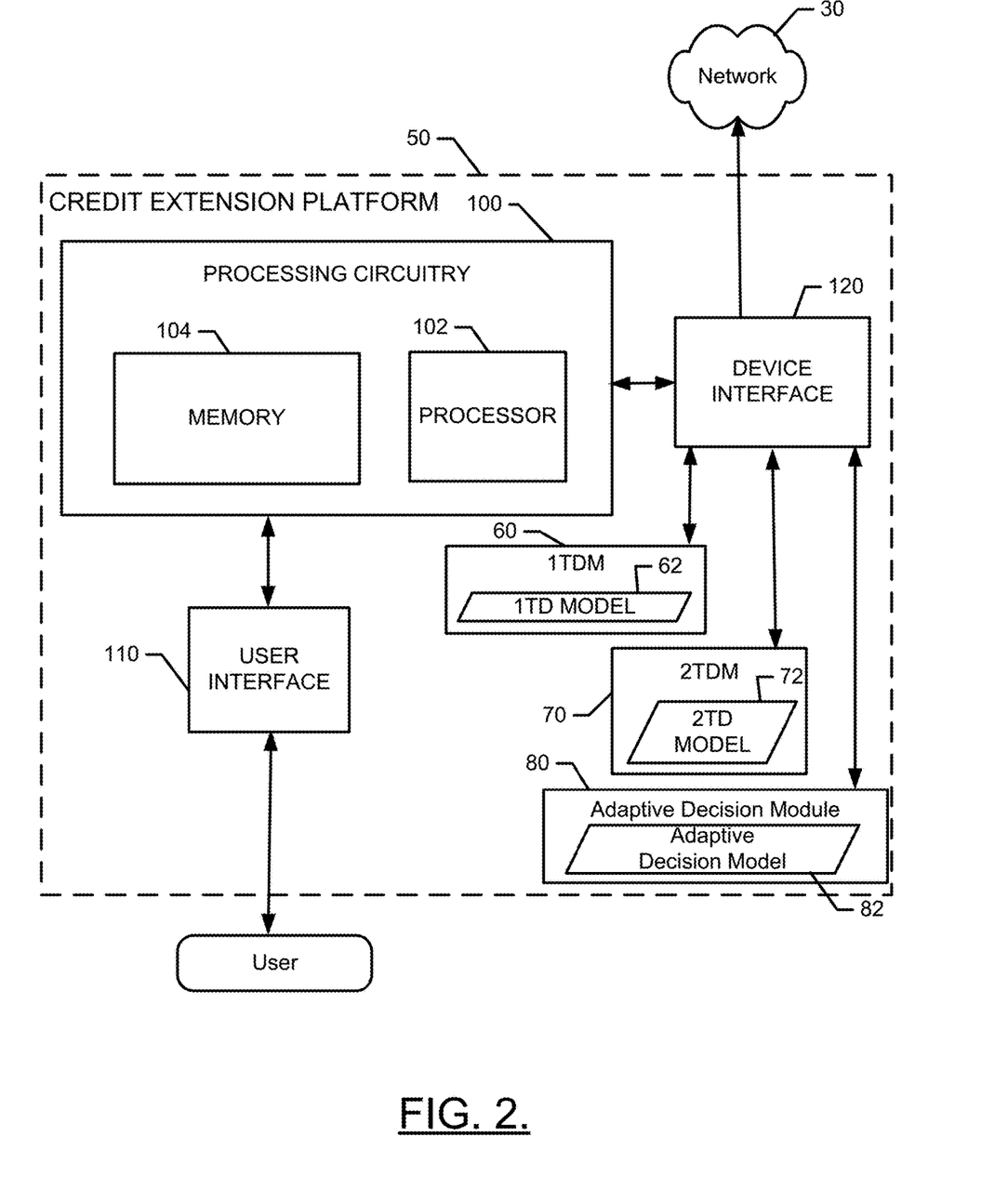
FIG. 2 illustrates a functional block diagram of a credit extension platform according to an example embodiment.

In an example embodiment, the credit extension platform 50 may include one or both of a first type of financing option decision module 60 (1TDM in FIGS. 1 and 2) and a second type of financing option decision module 70 (2TDM in FIGS. 1 and 2). The first and second types of financing option decision modules 60 and 70 may each include or communicate with various sub-modules or components (some of which are shown in greater detail in FIG. 2) that may be used to manage control flows associated with making credit extension decisions based on inputs provided to a first type of financing option decision model 62 (1TD model in FIG. 2) and a second type of financing option decision model 72 (2TD model in FIG. 2). In this context, the inputs may include conventional inputs, which may include identity information, credit score, transaction amount, etc. In this context, the inputs may also include relationship information specific to the user, the vendor, the product, the lender and interactions therebetween (e.g., including current and past transactions between the user and the lender). Outputs from each of the first and second types of financing option decision modules 60 and 70 may then be fed into an adaptive decision module 80, which may be configured to employ an adaptive decision model 82 (see FIG. 2) to determine which options to present to the user (and in what form). Some of the structures associated with the first and second types of financing options decision modules 60 and 70 and the adaptive decision module 80 of an example embodiment will be described in reference to FIG. 2.

FIG. 2 shows certain elements of an apparatus for provision of the credit extension platform 50 or other processing circuitry according to an example embodiment. The apparatus of FIG. 2 may be employed, for example, as the credit extension platform 50 itself (and/or the first and second types of financing option decision modules 60 and 70 and the adaptive decision module 80) operating at, for example, a network device, server, proxy, or the like (e.g., the application server 42 or client 20 of FIG. 1)). Alternatively, embodiments may be employed on a combination of devices (e.g., in distributed fashion on a device (e.g., a computer) or a variety of other devices/computers that are networked together). Accordingly, some embodiments of the present invention may be embodied wholly at a single device (e.g., the application server 42 or the client 20) or by devices in a client/server relationship (e.g., the application server 42 and one or more clients 20). Thus, although FIG. 2 illustrates the credit extension platform 50 as including the components shown, it should be appreciated that some of the components may be distributed and not centrally located in some cases. Furthermore, it should be noted that the devices or elements described below may not be mandatory and thus some may be omitted or replaced with others in certain embodiments.

Referring now to FIG. 2, an apparatus for provision of tools, services and/or the like for facilitating decision making regarding extensions of credit in an adaptive manner is shown. In this regard, the credit extension platform 50 may be configured to perform analysis, modeling, or other determinations based on the signaling and/or the information provided to determine whether a financial transaction or loan can be underwritten according to one of at least two different types of financing options and, if so, what credit offers to extend to the user receiving an affirmative result in such determinations. The apparatus may be an embodiment of the credit extension platform 50 or a device or component thereof including, for example, the first and second types of financing option decision modules 60 and 70 and the adaptive decision module 80. As such, configuration of the apparatus as described herein may transform the apparatus into the credit extension platform 50. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device (e.g., memory 104) and a processor 102 that may be in communication with or otherwise control a user interface 110 and a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In some embodiments, the processor 102 may be embodied as a central processing unit (CPU) or a graphics processing unit (GPU). In situations where the processing circuitry 100 is embodied as a server or at a remotely located computing device, the user interface 110 may be disposed at another device (e.g., at a computer terminal) that may be in communication with the processing circuitry 110 via the device interface 120 and/or a network (e.g., network 30). Thus, in some cases, the connection of the user to the user interface 110 may actually occur via the network 30.

The user interface 110 may be in communication with the processing circuitry 100 to receive an indication of a user input at the user interface 110 and/or to provide an audible, visual, mechanical or other output to the user. As such, the user interface 110 may include, for example, a keyboard, a mouse, a joystick, a display, a touch screen, a microphone, a speaker, augmented/virtual reality device, or other input/output mechanisms. In embodiments where the apparatus is embodied at a server or other network entity, the user interface 110 may be limited or even eliminated in some cases. Alternatively, the user interface 110 may be remotely located. In some cases, the user interface 110 may be located at one of the clients 20 of FIG. 1.

The device interface 120 may include one or more interface mechanisms for enabling communication with other devices and/or networks. In some cases, the device interface 120 may be any means such as a device or circuitry embodied in either hardware, software, or a combination of hardware and software that is configured to receive and/or transmit data from/to a network (e.g., network 30) and/or any other device or module in communication with the processing circuitry 100. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network, the network 30 may be any of various examples of wireless or wired communication networks such as, for example, data networks like a Local Area Network (LAN), a Metropolitan Area Network (MAN), and/or a Wide Area Network (WAN), such as the Internet, as described above.

In an example embodiment, the memory 104 may include one or more non-transitory storage or memory devices such as, for example, volatile and/or non-volatile memory that may be either fixed or removable. The memory 104 may be configured to store information, data, applications, instructions or the like for enabling the apparatus to carry out various functions in accordance with example embodiments of the present invention. For example, the memory 104 could be configured to buffer input data for processing by the processor 102. Additionally or alternatively, the memory 104 could be configured to store instructions for execution by the processor 102. As yet another alternative, the memory 104 may include one of a plurality of databases (e.g., database server 44) that may store a variety of files, contents or data sets. Among the contents of the memory 104, applications (e.g., a service application configured to interface with the client application 22) may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the memory 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the first and second types of financing option decision modules 60 and 70, and the adaptive decision module 80, each of which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the first and second types of financing option decision modules 60 and 70, and the adaptive decision module 80 as described below.

The first and second types of financing option decision modules 60 and 70 may each be configured to include tools to facilitate execution of a transactional-based credit extension decision based on the first and second type of financing option decision models 62 and 72, respectively. The tools may be provided in the form of various modules (or sub-modules) that may be instantiated by configuration of the processing circuitry 100. The first and second type of financing option decision models 62 and 72 may include tables, algorithms and/or the like that define decision making parameters based on the inputs provided thereto. The inputs may include many different signals that may be used to balance risks associated with extending credit to a user (or a device from which a credit extension request is received that purports to be associated with the user). These signals typically include identity information indicating an identity of the user, and other information enabling a check of a credit score of the user, information descriptive of the transaction itself or items, price and other parameters associated with the transaction. However, numerous other signals may also be included that may be used to detect fraud or confirm various aspects of the information noted above or other information that may be useful in making credit extension decisions. Each respective one of the first and second type of financing option decision models 62 and 72 may also include tables, algorithms and/or the like that enable computation (by the first and second types of financing option decision modules 60 and 70, respectively) of a credit limit that is suggested for the user and/or specific credit offers (e.g., including a term or details regarding the number, size and pace of repayments that are to be made) based on all of the other inputs received. The credit limit given (or suggested) and/or the credit offers made by the first and second types of financing option decision modules 60 and 70 may therefore be referred to as first and second types of financing option credit limits, respectively and/or first and second credit offers, respectively.

The adaptive decision module 80 may be configured to include tools to facilitate execution of an adaptive credit extension decision based on the adaptive decision model 82.

The tools may be provided in the form of various modules (or submodules) that may be instantiated by configuration of the processing circuitry 100. The adaptive decision model 82 may include tables, algorithms and/or the like that define decision making parameters based on the inputs provided thereto. The inputs may, as noted above, include the outputs of each of the first and second types of financing option decision modules 60 and 70. Thus, for example, the inputs to the adaptive decision model 82 (and the adaptive decision module 80) may include credit limit information and/or credit offers. In an example embodiment, the adaptive decision module 80 may include a machine learning component programmed to take the inputs described above alone or with potentially other signals that may be used to balance risks associated with extending credit to a user in order to determine a form and structure of credit offers that are to be presented to the user. The credit offers may include any combination of first and second types of financing option credit limits and/or first and second credit offers. The other signals may include information associated with the current and past transactions between the user and the entity that operates the credit extension platform 50 and/or any other relationship or other information that may inform the decision making process for selecting the form and structure of the credit offers. In this regard, for example, information indicative of most likely preferred options for the user (which may be learned by the machine learning component) may be used.

Figure 3:
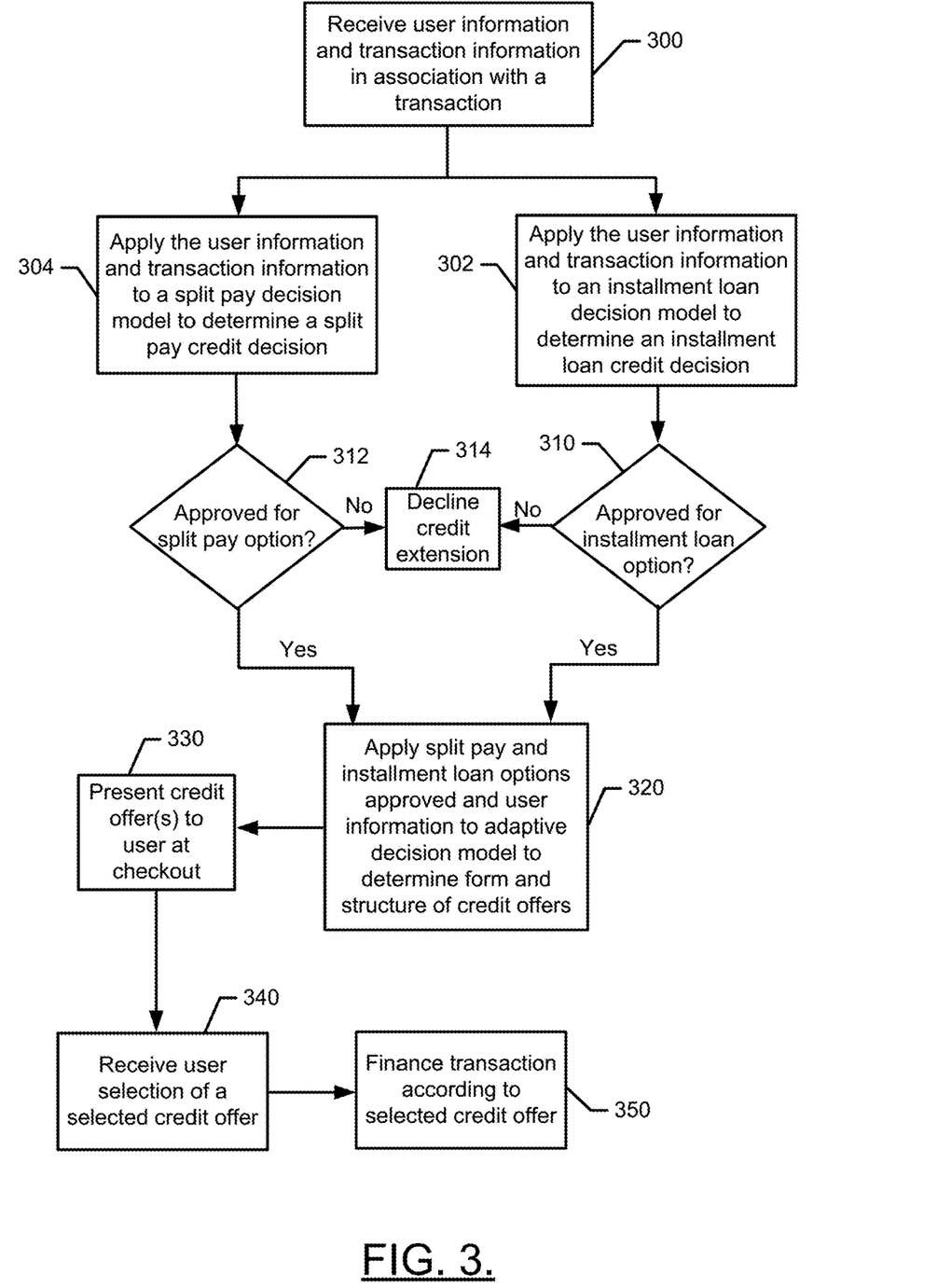
FIG. 3 illustrates a block diagram showing control flow associated with adaptive credit decisions at checkout in accordance with an example embodiment.

FIG. 3 illustrates a block diagram showing control flow associated with operation of the credit extension platform 50 in accordance with an example embodiment. As shown in FIG. 3, user information may be received along with transaction information in association with a transaction at operation 300. The user information may be information that identifies a user account, or information that can be used for setting up the user account. The transaction information may identify the vendor or merchant associated with the product or service that is the subject of the transaction, the product or service itself, and/or any other useful information associated with the vendor/merchant or the product/service that may be useful in connection with the operation of the credit extension platform 50 (e.g., machine learnable data that may inform how to tailor options or form and structure of messaging to the user). Thereafter, various underwriting rules and policies may be employed along with the corresponding model information for each respective type of financing option to determine whether the user is qualified to receive a credit offer. This may be accomplished by making each of the first and second types of financing option decision modules 60 and 70 run separately and independently (and simultaneously in some cases) to determine credit extension decisions for the user at operations 302 and 304.

In this regard, for example, operation 302 may include applying the user information and transaction information to an installment loan decision model to determine an installment loan credit decision (e.g., based on the underwriting policies and rules for installment loans, and the second type of financing option decision model 72). Meanwhile, operation 304 may include applying the user information and transaction information to a split pay decision model to determine a split pay credit decision (e.g., based on the underwriting policies and rules for the split pay option and the first type of financing option decision model 62. As noted above, each of these operations may be performed separately and independently, and corresponding determinations regarding the results of the operations may also thereafter be performed. Thus, responsive to operation 302, a determination may be made as to whether the user is approved for the installment loan option at operation 310. Similarly, responsive to operation 304, a determination may be made as to whether the user is approved for the split pay option at operation 312.

If the user is not approved for both the split pay option and the installment loan option, then the user may be declined any extension of credit at operation 314. However, if the user is approved for at least one or both of the split pay option and the installment loan option, then the control flow proceeds to operation 320. At operation 320, underwriting policies and rules for adaptive credit extension (e.g., via the adaptive decision module 80 and the adaptive decision model 82) may be applied. The adaptive decision module 80 may therefore receive information about the approval of either or both of the split pay and installment loan options and apply the adaptive decision model 82 thereto in order to determine which credit offers to provide to the user. For example, the adaptive decision module 80 may apply split pay and installment loan options approved and user information to the adaptive decision model 82 to determine the form and structure of credit offers that are approved for presentation to the user. These credit offers may be combinations of possible credit offers that were generated by the split pay option and installment loan option determinations made above, or may be modified from such options based on operation of the adaptive decision module 80. In this regard, for example, the adaptive decision module 80 may employ machine learning to tailor the credit offers to the user, merchant, or for the product associated with the transaction.

Thereafter, the credit offer (or offers) may be presented to the user at checkout for completion of the transaction at operation 330. In this context, the checkout may be a virtual or physical checkout, where the user attempts to purchase an item or service from a vendor via using funds obtained by credit from the entity that operations the credit extension platform 50. A user selection of one of the credit offers (or the presented credit offer) may thereafter be received at operation 340, thereby making any credit offer that is selected by the user a "selected credit offer." At operation 350, the transaction may be financed according to the selected credit offer. In this regard, the loan may be underwritten and the corresponding repayment schedule associated with the confirmation of the loan may be applicable. A new phase may then be entered, which may include post checkout and the loan repayment period.

Figure 4:
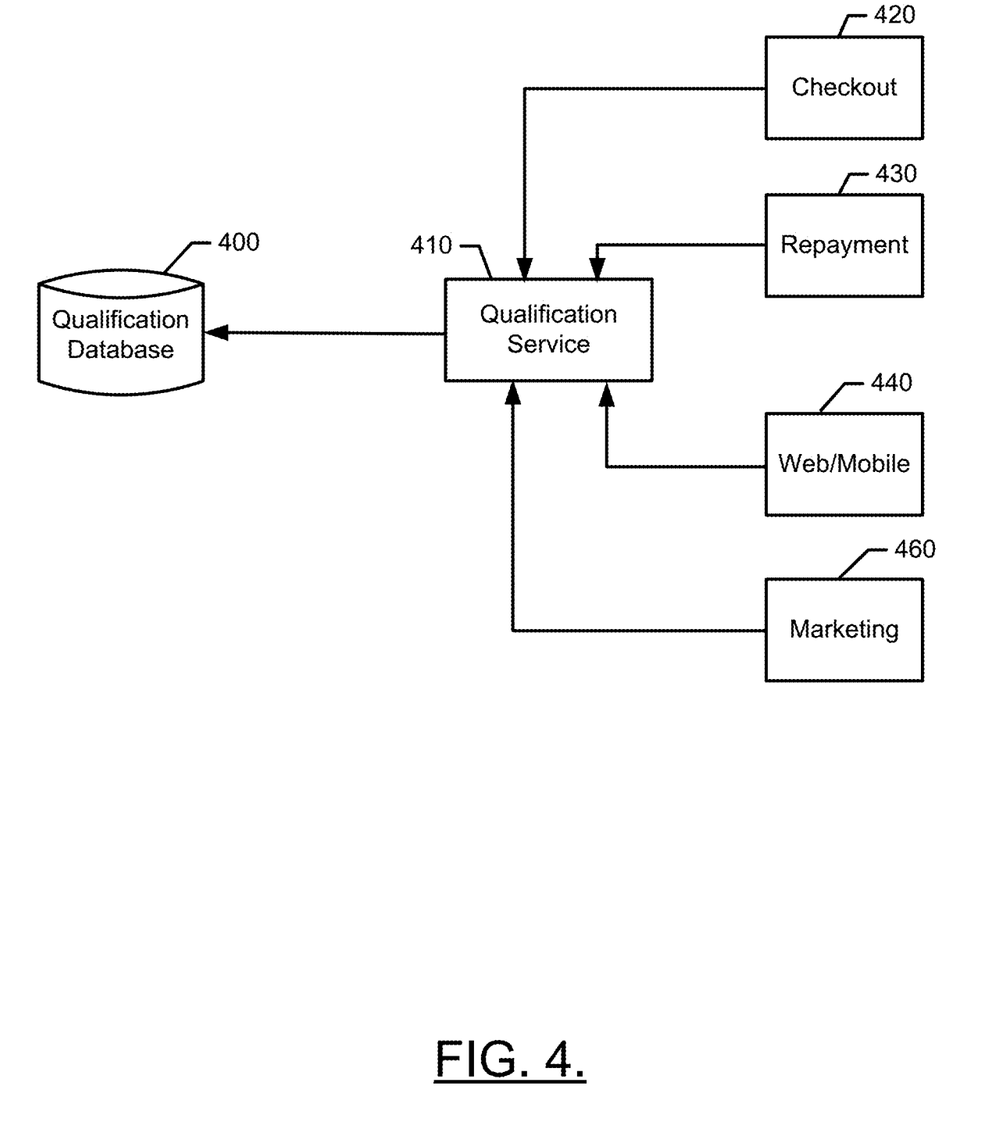
FIG. 4 illustrates a block diagram showing adaptive credit system interactions in accordance with an example embodiment.

The method of FIG. 3 and the hardware described in reference to FIG. 2 are merely examples of methods and hardware that could be employed to implement example embodiments. Moreover, in some cases, various services or systems may cooperate to practice example embodiments, and different combinations of hardware and software may be employed to implement such services and systems. FIG. 4 is a block diagram of various systems interactions that may be employed to implement a user-level credit capability in accordance with an example embodiment.

As shown in FIG. 4, a qualification database 400 may store information associated with qualification (e.g., pre-qualification for existing user accounts, or qualification at checkout by setting up a user account during transaction processing) of a plurality of users, each having a corresponding user account setup and maintained as described above. In an example embodiment, the qualification database 400 may be a portion of the database server 44 of FIG. 1, or implemented in memory 104 of FIG. 2. The qualification database 400 may also store information associated with prior transactions for the users, vendors, products, etc., to enable machine learning to be conducted with respect to such information. A qualification service 410 may interface with and update the qualification database 400. The qualification service 410 may be implemented from the credit extension platform 50 (e.g., by a combination of the first and second types of financing option decision modules 60 and 70 and the adaptive decision module 80).

Checkout information may be provided to the qualification service 410 by various checkout systems 420 associated with respective different vendors or websites. Repayment information may also be provided to the qualification service 410 by various repayment systems 430 associated with respective different vendors or websites. Web or mobile devices 440 may be examples of clients 20 that may interact with the qualification service 410 to setup user accounts and to initiate transactions (via the checkout systems 420) or make payments (via the repayment systems 430). The qualification service 410 may handle all operations associated with operations 300 to 350 in FIG. 3 of the prequalification phase described above.

The qualification service 410 may be employed to make credit extension decisions described above in an adaptive way, and particularly without requiring the user to make a decision as to a financing option until the checkout system 420 is employed. In some cases, the qualification service 410 may, as noted above, augment (or boost) credit limits based on machine learning. In some cases, the machine learning may be performed with respect to marketing information from a marketing system 460. Thus, for example, targeted promotions may be provided to selected users. Promotions, rebate offers, sale pricing and other marketing efforts may therefore be incorporated into the checkout processes for individual customers. Favorited items, or other behaviors exhibited by users that may show high interest in an time (or conversely activities that show low interest) may therefore be implemented on an adaptive basis to improve the quality of credit offers to potentially provide incentives for buying to the user. Merchant incentives may also be provided. Machine learning may also (e.g., based on past knowledge of user behavior or tendencies) provide a structure and form for credit offers that are targeted to the user. For example, if it is known (or can be learned through repeated interactions) that the user favors low interest options, no interest options, short or long terms, or other specific traits of credit offers that the user qualifies to receive, the qualification service 410 may tailor a smaller list of options to the user where the favored options are prominently (or only) displayed. In other words, personalized terms may be provided to users for the credit offers they receive.

As can be appreciated from the description above, the user may be allowed to proceed all the way to checkout prior to picking any particular financing option for closing the transaction. By waiting until checkout, and sometimes also by employing machine learning techniques described above, the form and structure of credit offerings (as well as the content thereof) may be tailored to the user, to incentivize the user to select credit options that are most beneficial to or desired by the user. The corresponding incentives and immediately perceptible increased flexibility for the user may ultimately provide a technical means by which to create a win/win relationship between the entity and the user.

Figure 5:
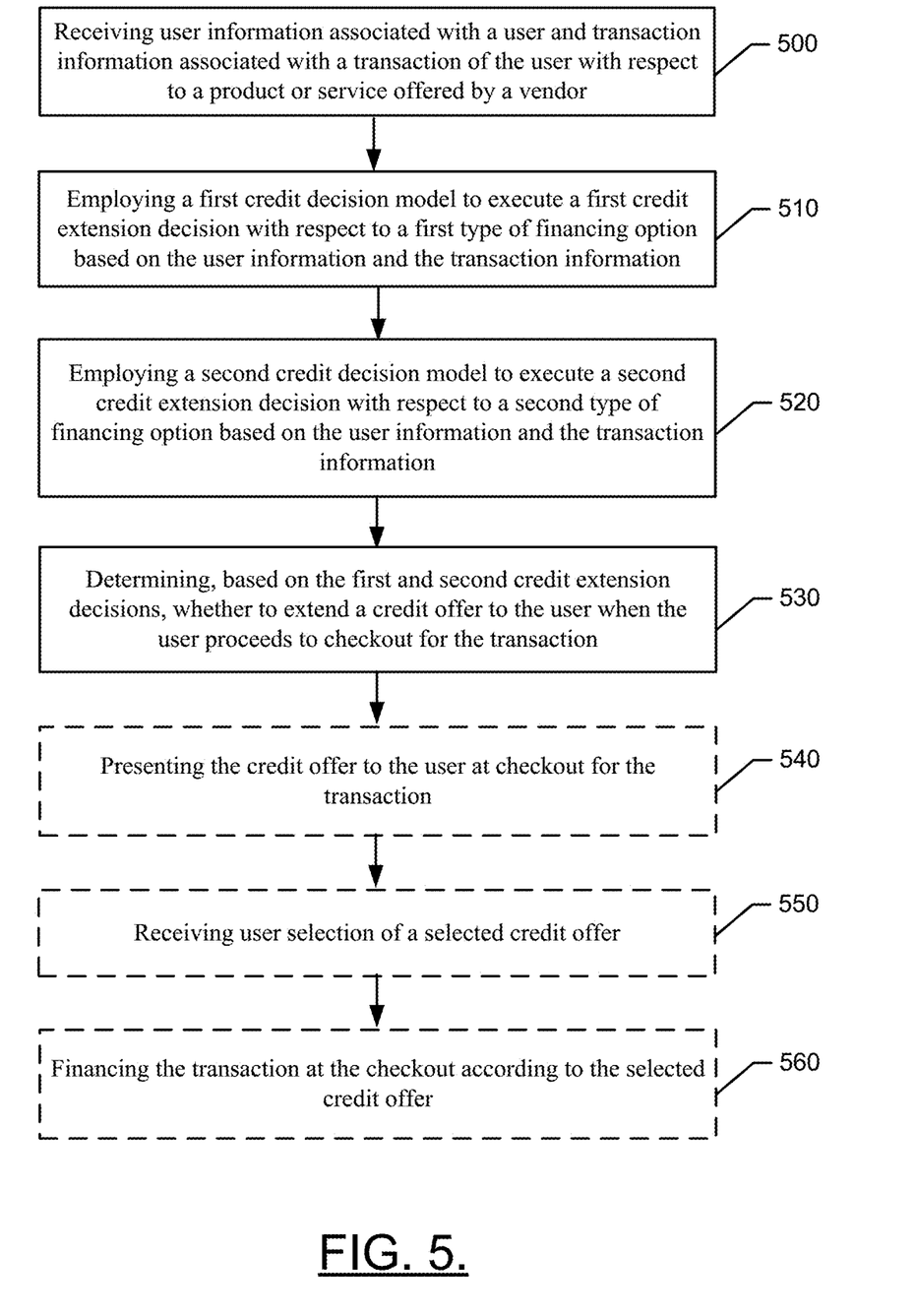
FIG. 5 illustrates a block diagram of a method of employing adaptive credit decisions in accordance with an example embodiment.

From a technical perspective, the credit extension platform 50 described above may be used to support some or all of the operations described above. As such, the apparatuses described in FIGS. 2 and 4 may be used to facilitate the implementation of several computer program and/or network communication based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of for employing adaptive credit decisions in relation to extension of a loan to a user according to one embodiment of the invention is shown in FIG. 5. The method may include receiving user information associated with a user and transaction information associated with a transaction of the user with respect to a product or service offered by a vendor at operation 500. The method may further include employing a first credit decision model to execute a first credit extension decision with respect to a first type of financing option based on the user information and the transaction information at operation 510, and employing a second credit decision model to execute a second credit extension decision with respect to a second type of financing option based on the user information and the transaction information at operation 520. The method may further include determining, based on the first and second credit extension decisions, whether to extend a credit offer to the user when the user proceeds to checkout for the transaction at operation 530. The first and second types of financing options may be different in terms of the range of lengths of terms for repayment that are offered for each. In some cases, the ranges of lengths of terms may not be coextensive. The first and second types of financing options may also be different with respect to the applicability of interest to the payments, or if a service fee is charged in lieu of interest.

In an example embodiment, an apparatus for performing the method of FIG. 5 above may comprise a processor (e.g., the processor 102) or processing circuitry configured to perform some or each of the operations (500-530) described above. The processor may, for example, be configured to perform the operations (500-530) by performing hardware implemented logical functions, executing stored instructions, or executing algorithms for performing each of the operations. In some embodiments, the processor or processing circuitry may be further configured for additional operations or optional modifications to operations 500 to 530.

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, the method may further include optional operations (shown in dashed lines in FIG. 5) such as, presenting the credit offer to the user at checkout for the transaction at operation 540, receiving user selection of a selected credit offer at operation 550, and financing the transaction at the checkout according to the selected credit offer at operation 560. In an example embodiment, the first and second credit extension decisions of operation 510 and 520 may be performed simultaneously. In some embodiments, the first type of financing option may be a split pay option, and the second type of financing option may be an installment loan option. In an example embodiment, determining whether to extend the credit offer may include declining to extend the credit offer responsive to the user being declined in both the first and second credit extension decisions. In some cases, determining whether to extend the credit offer may include extending the credit offer including a plurality of credit offers of the first type of financing option and a plurality of credit offers of the second type of financing option responsive to the user being approved in both the first and second credit extension decisions. In an example embodiment, determining whether to extend the credit offer may include extending the credit offer including a combination of credit offers of the first type of financing option and the second type of financing option responsive to the user being approved in both the first and second credit extension decisions. In some cases, determining whether to extend the credit offer may include extending the credit offer including a plurality of credit offers of only the first type of financing option responsive to the user being approved in only the first credit extension decision. In an example embodiment, determining whether to extend the credit offer may include applying credit offer options associated with the first type of financing option or the second type of financing option to an adaptive decision model to determine a form and structure of the credit offer. In some cases, determining whether to extend the credit offer may include applying credit offer options associated with both the first type of financing option and the second type of financing option to the adaptive decision model to determine the form and structure of the credit offer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for employing adaptive credit decisions in relation to extension of a loan to a user, the method comprising:
receiving, at a server comprising processing circuitry including a processor and memory storing instructions for execution by the processor, user information associated with the user and transaction information associated with a transaction of the user with respect to a product or service offered by a vendor, the transaction having an order value;
employing, by the processing circuitry of the server, a first credit decision model associated with transactions below a threshold average order value to execute a first credit extension decision with respect to a first type of financing option based on the user information and the transaction information;
employing, by the processing circuitry of the server, a second credit decision model associated with transactions above the threshold average order value to execute a second credit extension decision with respect to a second type of financing option based on the user information and the transaction information;
determining, by the processing circuitry of the server, based on the first and second credit extension decisions, whether to extend a credit offer to the user when the user proceeds to checkout for the transaction;
providing, by the processing circuitry of the server, instructions to display the credit offer at a display screen of a device of the user, wherein the credit offer comprises both a first selectable display element defining a first credit offer associated with the first type of financing option and a second selectable display element defining a second credit offer associated with the second type of financing option responsive to the user being approved in both the first and second credit extension decisions without regard to whether the order value is above or below the threshold average order value; and receiving, by the processing circuitry of the server, a selected option from the user of one of the first credit offer or the second credit offer to facilitate financing the transaction according to the selected option, wherein determining whether to extend the credit offer comprises applying credit offer options associated with the first type of financing option or the second type of financing option to an adaptive decision model to determine a form and structure of the credit offer, wherein determining whether to extend the credit offer comprises applying credit offer options associated with both the first type of financing option and the second type of financing option to the adaptive decision model to determine the form and structure of the credit offer, and wherein the first and second credit extension decisions are performed simultaneously.

2. The method of claim 1, wherein the first type of financing option is a split pay option, and wherein the second type of financing option is an installment loan option.

3. The method of claim 1, wherein determining whether to extend the credit offer comprises declining to extend the credit offer responsive to the user being declined in both the first and second credit extension decisions.

4. The method of claim 1, wherein determining whether to extend the credit offer comprises extending the credit offer including a plurality of first credit offers of the first type of financing option and a plurality of second credit offers of the second type of financing option responsive to the user being approved in both the first and second credit extension decisions.

5. The method of claim 1, wherein determining whether to extend the credit offer comprises extending the credit offer including a combination of one or more instances of first credit offers of the first type of financing option and one or more instances of second credit offers of the second type of financing option responsive to the user being approved in both the first and second credit extension decisions.

6. The method of claim 1, wherein determining whether to extend the credit offer comprises extending the credit offer including a plurality of first credit offers of only the first type of financing option responsive to the user being approved in only the first credit extension decision.

7. The method of claim 1, further comprising financing the transaction at the checkout according to the selected option.

8. An apparatus for employing adaptive credit decisions in relation to extension of a loan to a user, the apparatus comprising a computer server including processing circuitry comprising memory storing instructions that when executed by a processor of the processing circuitry configured the computer server to:

receive, by the processing circuitry, user information associated with the user and transaction information associated with a transaction of the user with respect to a product or service offered by a vendor, the transaction having an order value;

employ, by the processing circuitry, a first credit decision model associated with transactions below a threshold average order value to execute a first credit extension decision with respect to a first type of financing option based on the user information and the transaction information;

employ, by the processing circuitry, a second credit decision model associated with transactions above the threshold average order value to execute a second credit extension decision with respect to a second type of financing option based on the user information and the transaction information;

determine, by the processing circuitry, based on the first and second credit extension decisions, whether to extend a credit offer to the user when the user proceeds to checkout for the transaction, provide, by the processing circuitry of the computer server, instructions to display the credit offer at a display screen of a device of the user, wherein the credit offer comprises both a first selectable display element defining a first credit offer associated with the first type of financing option and a second selectable display element defining a second credit offer associated with the second type of financing option responsive to the user being approved in both the first and second credit extension decisions without regard to whether the order value is above or below the threshold average order value; and receive, by the processing circuitry, a selected option from the user of one of the first credit offer or the second credit offer to facilitate financing the transaction according to the selected option, wherein the processing circuitry is configured to determine whether to extend the credit offer by applying credit offer options associated with the first type of financing option or the second type of financing option to an adaptive decision model to determine a form and structure of the credit offer, wherein the processing circuitry is configured to determine whether to extend the credit offer by applying credit offer options associated with both the first type of financing option and the second type of financing option to the adaptive decision model to determine the form and structure of the credit offer, and wherein the first and second credit extension decisions are performed simultaneously.

9. The apparatus of claim 8, wherein the first type of financing option is a split pay option, and wherein the second type of financing option is an installment loan option.

10. The apparatus of claim 8, wherein the processing circuitry is configured to determine whether to extend the credit offer by declining to extend the credit offer responsive to the user being declined in both the first and second credit extension decisions.

11. The apparatus of claim 8, wherein the processing circuitry is configured to determine whether to extend the credit offer by extending the credit offer including a plurality of first credit offers of the first type of financing option and a plurality of second credit offers of the second type of financing option responsive to the user being approved in both the first and second credit extension decisions.

12. The apparatus of claim 8, wherein the processing circuitry is configured to determine whether to extend the credit offer by extending the credit offer including a combination of one or more instances of first credit offers of the first type of financing option and one or more instances of second credit offers of the second type of financing option responsive to the user being approved in both the first and second credit extension decisions.

13. The apparatus of claim 8, wherein the processing circuitry is configured to determine whether to extend the credit offer by extending the credit offer including a plurality of first credit offers of only the first type of financing option responsive to the user being approved in only the first credit extension decision.

14. The apparatus of claim 8, wherein the processing circuitry is further configured to finance the transaction at the checkout according to the selected option.

\* \* \* \* \*

UNITED STATES PATENT AND TRADEMARK OFFICE
CERTIFICATE OF CORRECTION

| | | |
|---|---|---|
| PATENT NO. | : 11,842,392 B2 | Page 1 of 1 |
| APPLICATION NO. | : 17/478074 | |
| DATED | : December 12, 2023 | |
| INVENTOR(S) | : Shawn Krisman et al. | |

It is certified that error appears in the above-identified patent and that said Letters Patent is hereby corrected as shown below:

In the Claims

In Column 19, Claim 8, Line 51, "configured" should read --configure--

Signed and Sealed this
Twenty-sixth Day of March, 2024

*Katherine Kelly Vidal*

Katherine Kelly Vidal
*Director of the United States Patent and Trademark Office*